United States Patent

[11] 3,540,754

| [72] | Inventor | Philipp Schmidt |
| | | Frankenbach, Germany |
| [21] | Appl. No. | 730,797 |
| [22] | Filed | May 21, 1968 |
| [45] | Patented | Nov. 17, 1970 |
| [73] | Assignee | NSU Motorenwerke Aktiengesellschaft |
| | | Neckarsulm, Germany |
| [32] | Priority | May 23, 1967 |
| [33] | | Germany |
| [31] | | No. N30557 |

[54] MOTOR VEHICLE STEERING MECHANISM
4 Claims, 1 Drawing Fig.
[52] U.S. Cl. .................................................. 280/96
[51] Int. Cl. ................................................... B62d 7/16
[50] Field of Search ........................................... 280/96, 95,
93, 90, 87; 180/79.2; 74/498

[56]  References Cited
UNITED STATES PATENTS

| 2,151,850 | 3/1939 | Hedrick et al. | 280/90 |
| 2,313,704 | 3/1943 | Hey | 180/79.2 |
| 2,323,669 | 7/1943 | Murty et al. | 280/91 |
| 2,549,925 | 4/1951 | Paton | 280/96X |

FOREIGN PATENTS

| 552,300 | 11/1956 | Italy | 280/96 |

Primary Examiner—Kenneth H. Betts
Attorney—Kane, Dalsimer, Kane, Sullivan and Kurucz ABSTRACT: This invention relates to a motor vehicle comprising a rack and pinion steering with a steering housing in which the rack is supported for longitudinal movement and in which the pinion is supported for rotation by the steering shaft and in engagement with the rack, the rack acting by way of a steering lever on the tie rods of the vehicle.

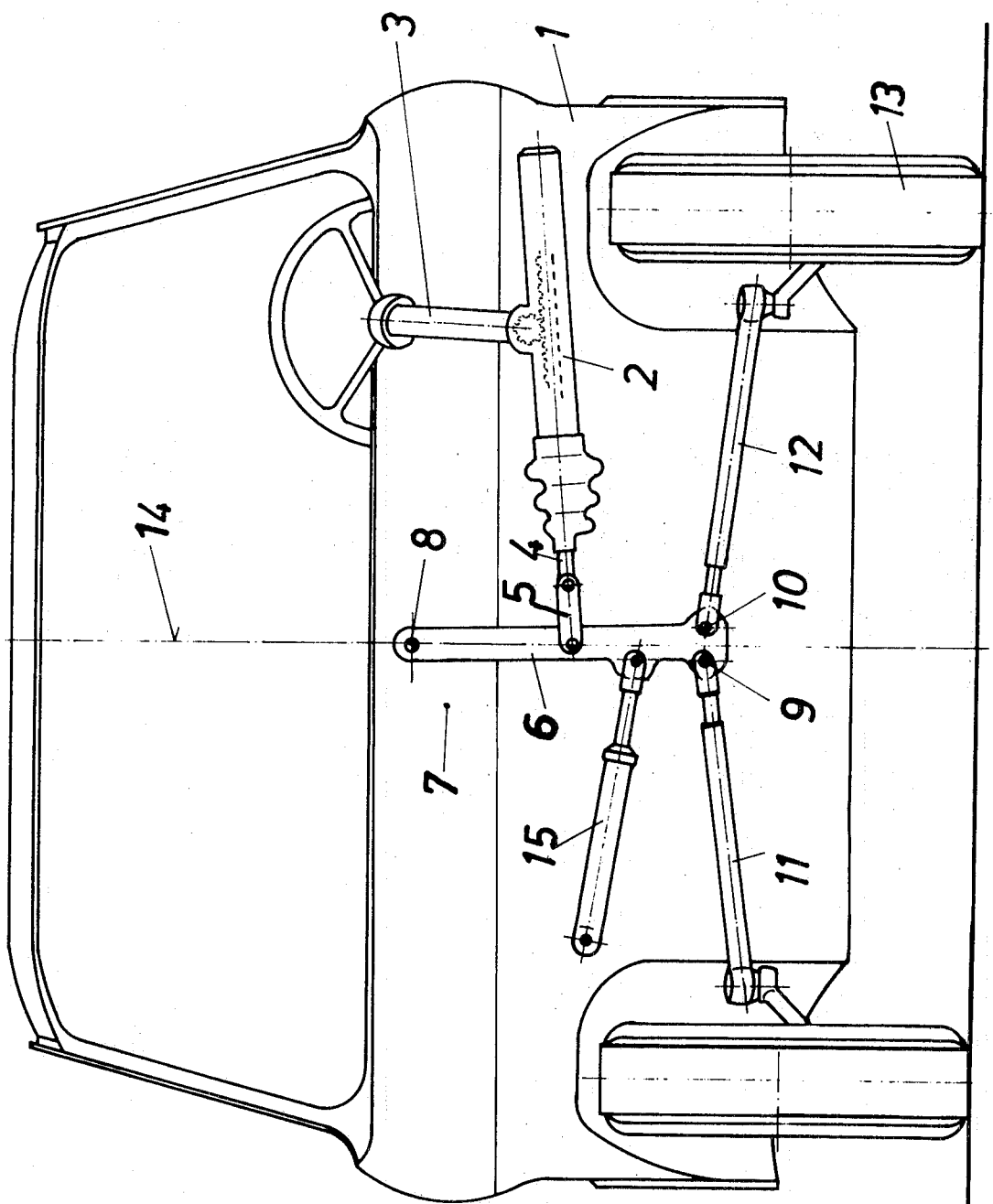

MOTOR VEHICLE STEERING MECHANISM

It is an object of the invention to provide a rack and pinion steering of the kind set forth which provides for small vertical movement only of the tie rods on movement by the rack via the steering lever. It is a further object of the invention to enable a simple and inexpensive attachment of the steering lever to the vehicle body.

With these and other objects in mind, the invention proposes to form the steering lever as a one-arm lever which is at its upper end pivotally connected to the vehicle body and to the lower end of which the tie rods are pivotally connected whereby the rack or an extension thereof is pivotally secured to the lever between the ends thereof.

This proposal enables the lever to be secured in a simple manner for instance to the upper portion of the wall separating the engine compartment from the passenger compartment, or to a transverse strut below the front window. In view of the long distance between the pivot point of the lever and the points of attachment of the tie rods at the lever, the vertical movements of these points of attachment are very small on tilting of the lever thereby preventing an adverse effect on the steering geometry.

The steering housing may be rigidly attached to the wall separating the engine compartment from the passenger compartment. In this case, the rack or an extension thereof is connected to the steering lever by way of an articulated member. It is also possible to connect the rack or an extension thereof directly to the steering lever in which case it is necessary that the steering housing is elastically connected to said wall so that it can follow allowing for tilting movements of the rack.

It is preferred to arrange the pivot point of the steering lever in or near the longitudinal center plane of the vehicle. This arrangement has the advantage that right hand steering or left hand steering can be provided without changing the steering lever and the tie rods. Furthermore, a shock absorber or a servomotor can be attached to the steering lever without difficulties.

A preferred embodiment of the invention is shown in the drawing in which the complete steering arrangement is shown as seen from the front end of the vehicle.

To the wall 1 which separates the motor compartment from the passenger compartment, there is rigidly connected the steering housing 2 which contains a pinion driven by the steering shaft 3 and a rack 4 which is engaged and driven by the pinion. The rack 4 is connected to a one-arm steering lever 6 by an articulated member 5. The steering lever 6 is pivotally connected at 8 to the wall 1 or to a transverse strut 7 of the vehicle body. On turning of the steering shaft 3, the rack 4 is shifted and turns the steering lever 6 about pivot point 8. Thereby the tie rods 11 and 12 which are pivotally connected to the steering lever 6 at points 9 and 10 are displaced so that the wheels 13 perform a steering movement.

If the steering housing 2 is elastically connected to the vehicle body, the member 5 can be dispensed with and the rack 4 or an extension thereof can be directly connected to the steering lever 6.

The pivot point 8 of the steering lever 6 is arranged preferably in or near the longitudinal center plane 14 of the vehicle and the steering lever 6 is arranged in such way that it is vertical on straight forward movement of the vehicle. By this symmetrical arrangement, the tie rods 11 and 12 can be made identical and it is possible to arrange for right hand steering or left hand steering by simply arranging the steering housing 2 on the left side or on the right side of the steering lever 6.

A shock absorber or a hydraulic piston and cylinder servomotor 15 can be arranged to act directly on the steering lever 6.

Thus, the several aforenoted objects and advantages are most effectively attained.

I claim:

1. Motor vehicle comprising a rack and pinion steering with a steering housing in which the rack is supported for longitudinal movement and in which the rack and the pinion engage, the rack acting by way of a steering lever on the tie rods of the vehicle, the steering lever being a one-arm lever which is pivotally connected at its upper end on the vehicle body and to the lower end of which the tie rods are pivotally connected, and the rack having means for pivotally coupling it to the lever between the ends thereof so that when the steering lever is tilted only a minimum amount of vertical movement occurs at the point where the steering lever is connected to the tie rods thereby alleviating the danger of impairment of the exactness of the steering geometry.

2. A motor vehicle according to claim 1 wherein the steering housing is rigidly attached to the wall separating the engine compartment from the passenger compartment, the rack pivotal means being connected to the steering lever by an articulated member.

3. A motor vehicle according to claim 1 wherein the pivot point of the steering lever at the vehicle body is proximate the longitudinal center plane of the vehicle.

4. Motor vehicle comprising a rack and pinion steering with a steering housing in which the rack is supported for longitudinal movement and in which the rack and the pinion engage, the rack acting by way of a steering lever on the tie rods of the vehicle, the steering lever being a one-arm lever which is pivotally connected at its upper end on the vehicle body and to the lower end of which the tie rods are pivotally connected, the rack having means for pivotally coupling it to the lever between the ends thereof, the steering housing being rigidly attached to the wall separating the engine compartment from the passenger compartment, the rack pivotal means being connected to the steering lever by an articulated member, and the articulated member being a link pivotally connected on one hand to the rack and on the other hand to the steering lever.